UNITED STATES PATENT OFFICE.

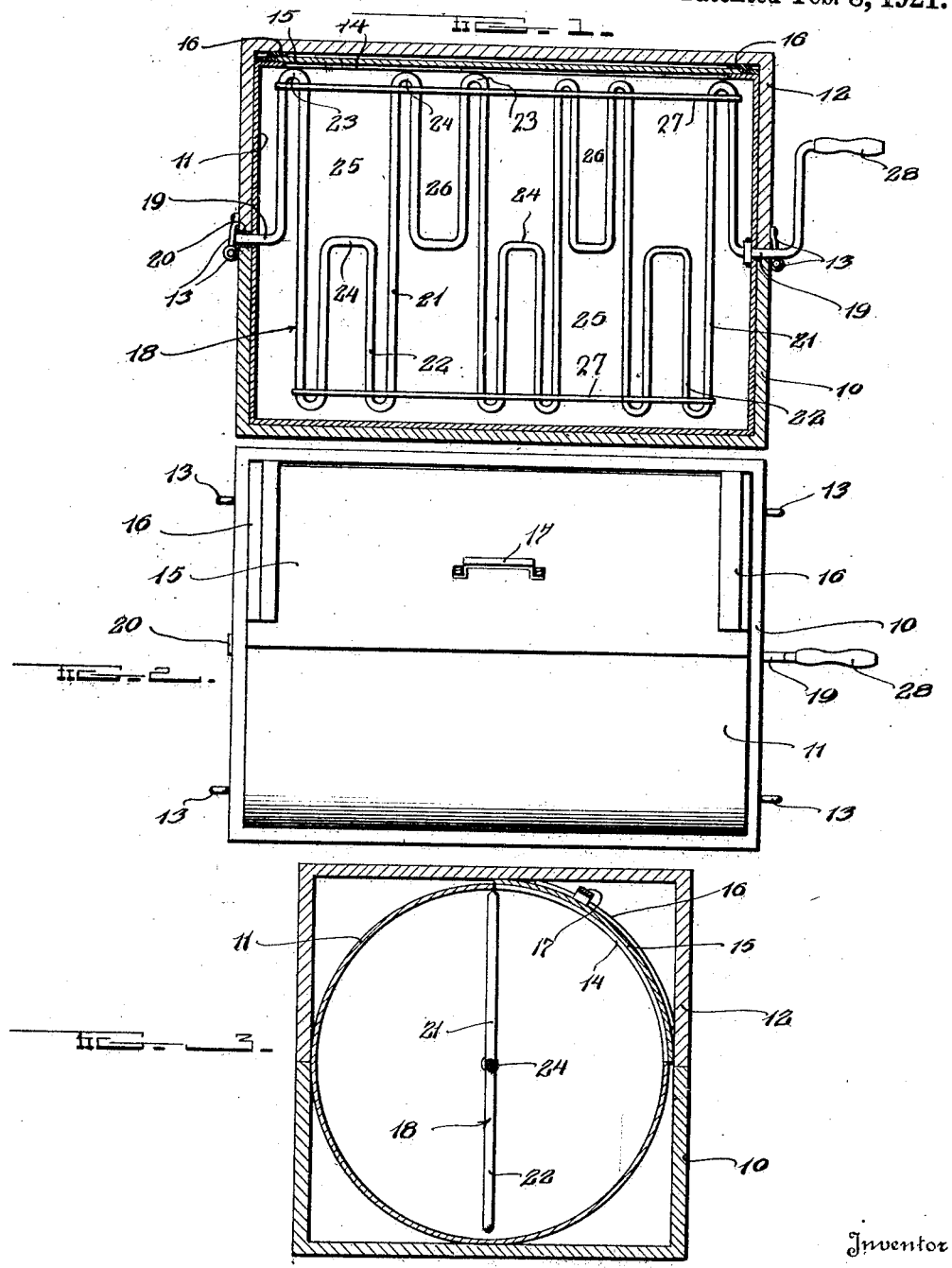

ANTHONY MATRAZZO, OF BALTIMORE, MARYLAND.

DOUGH-MIXING MACHINE.

1,368,183.  Specification of Letters Patent.  Patented Feb. 8, 1921.

Application filed February 7, 1920. Serial No. 356,847.

*To all whom it may concern:*

Be it known that I, ANTHONY MATRAZZO, a subject of the King of Italy, residing at East Baltimore, Maryland, have invented new and useful Improvements in Dough-Mixing Machines, of which the following is a specification.

This invention relates to improvements in dough mixing machines and aims to provide a simple and inexpensive machine, by means of which bread, cake or other dough may be thoroughly mixed with a minimum amount of time and labor.

Another object is the provision of a mixing machine having a novel form of agitator, which is rotatably mounted within a mixing cylinder and which will act to force the contents of the cylinder about, to thoroughly mix the ingredients.

The invention further includes the following novel features and details of construction, to be hereinafter more fully described, illustrated in the accompanying drawings and pointed out in the claims hereunto appended.

In the drawings:

Figure 1 is a longitudinal sectional view through a dough mixing machine embodying the present invention.

Fig. 2 is a plan view with the casing cover removed.

Fig. 3 is a transverse sectional view.

Referring to the drawings in detail, wherein like characters of reference denote the corresponding parts, the reference character 10 indicates an outer casing, preferably constructed of wood. This casing is rectangular in shape and receives a metal cylinder 11, preferably formed of sheet metal, for example, galvanized iron. The cylinder 11 is further provided with a cover 12, which may be hingedly or otherwise secured to the casing 10, but it is preferred to have this cover removable and it is secured in position by means of hooks and eyes 13.

The cylinder 11 forms the mixing chamber for the dough and is provided with an opening 14, which is adapted to be closed by an arcuate closer 15, slidable in guides 16 located at each end of the cylinder. The handle 17 is provided for convenience of operation.

Mounted for rotation within the cylinder 11 is an agitator 18, the said agitator being preferably formed of a single piece of material, which includes alined bearing portions 19, for operation in axially arranged bearings 20 carried by the casing 10. The agitator further includes transversely extending long and short bars 21 and 22 respectively, the said bars lying in substantially the same plane and being irregularly spaced apart and connected by longitudinally disposed short bars 23 and 24. This structure provides a plurality of oppositely extending alternately arranged loops 24 and spaces 25 and 26, the bars of the loops forcing the mixture through these spaces so as to thoroughly agitate and mix the same.

The loops 24 along one side of the agitator are connected by a rod 27, while a handle 28 is connected to the agitator for convenience of operation.

The invention is susceptible of various changes in its form, proportions and minor details of construction, and the right is herein reserved to make such changes as properly fall within the scope of the appended claims.

Having described the invention what is claimed is:—

1. A dough mixer comprising a mixing cylinder, an agitator mounted for rotation in bearings provided at each end and axially of the cylinder, said agitator being formed from a single piece of material and bent to provide alined bearing engaging portions and intermediate transversely arranged long and short bars and longitudinal connecting bars defining oppositely and alternately arranged loops, bars connecting the loops and a handle for operating the agitator.

2. A dough mixer comprising a mixing cylinder, an agitator mounted for rotation therein, said agitator being formed from a single piece of material bent to provide alined bearing portions and intermediate transversely arranged long and short bars, the last mentioned bars being arranged in pairs between the long bars and extending approximately one-half the length of the latter and being alternately and oppositely disposed to provide alternately and oppositely arranged relatively large spaces and restricted spaces upon opposite sides of the large spaces and a handle for operating the agitator.

In testimony whereof I affix my signature.

ANTHONY MATRAZZO.